United States Patent [19]

Lemelson

[11] Patent Number: 5,024,714
[45] Date of Patent: Jun. 18, 1991

[54] METHOD AND APPARATUS FOR FORMING A COMPOSITE MATERIAL

[76] Inventor: Jerome H. Lemelson, 85 Rector St., Metuchen, N.J. 08840

[21] Appl. No.: 753,726

[22] Filed: Jul. 10, 1985

[51] Int. Cl.$^5$ .......................... B29C 47/06; B32B 31/20
[52] U.S. Cl. ............................... 156/243; 156/244.11; 156/244.23; 156/244.24; 156/244.27; 156/324; 156/500
[58] Field of Search .............. 156/243, 244.11, 244.23, 156/244.24, 244.27, 324, 500, 244.22, 244.12, 501

[56] References Cited

U.S. PATENT DOCUMENTS

| | | |
|---|---|---|
| 2,722,735 | 11/1955 | Beamish ............................... 156/324 |
| 3,574,030 | 4/1971 | Callander et al. ............... 156/244.27 |
| 3,594,249 | 7/1971 | Mueller-Tamm et al. ...... 156/244.24 |
| 3,773,600 | 11/1973 | Rudnev ................................. 156/324 |
| 3,788,923 | 1/1974 | Soliman ........................... 156/244.11 |
| 4,469,543 | 9/1984 | Segal et al. ......................... 156/324 |
| 4,498,946 | 2/1985 | Schöllkopf et al. ................ 156/324 |
| 4,547,254 | 10/1985 | Berner ................................. 156/324 |

FOREIGN PATENT DOCUMENTS 13338 9/1962 Japan ..................................... 156/243

Primary Examiner—Caleb Weston

[57] ABSTRACT

An apparatus and method for producing composite structural members on a continuous and automatic basis. In one form, a metal, such as aluminum, is continuously extruded, die rolled or die driven to shape or by a combination of such operations and a high strength plastic polymer, co-polymer or the like is either extruded and laminated to one or more surfaces of the extruded metal structural shape downstream of the die forming same. In another form, two or more metal extrusions are driven parallel to each other while a plastic resin is extruded between same and passed between rolling dies or pulled through a stationary die to form a continuous laminate which is automatically cut to length. In another form, reinforcing fibers are added to the resin. In yet another form, filaments of high strength plastic, glass or carbon are continuously woven into high strength cloth which is fed between continuously fed sheets or structural members of metal and laminated therewith.

6 Claims, 1 Drawing Sheet

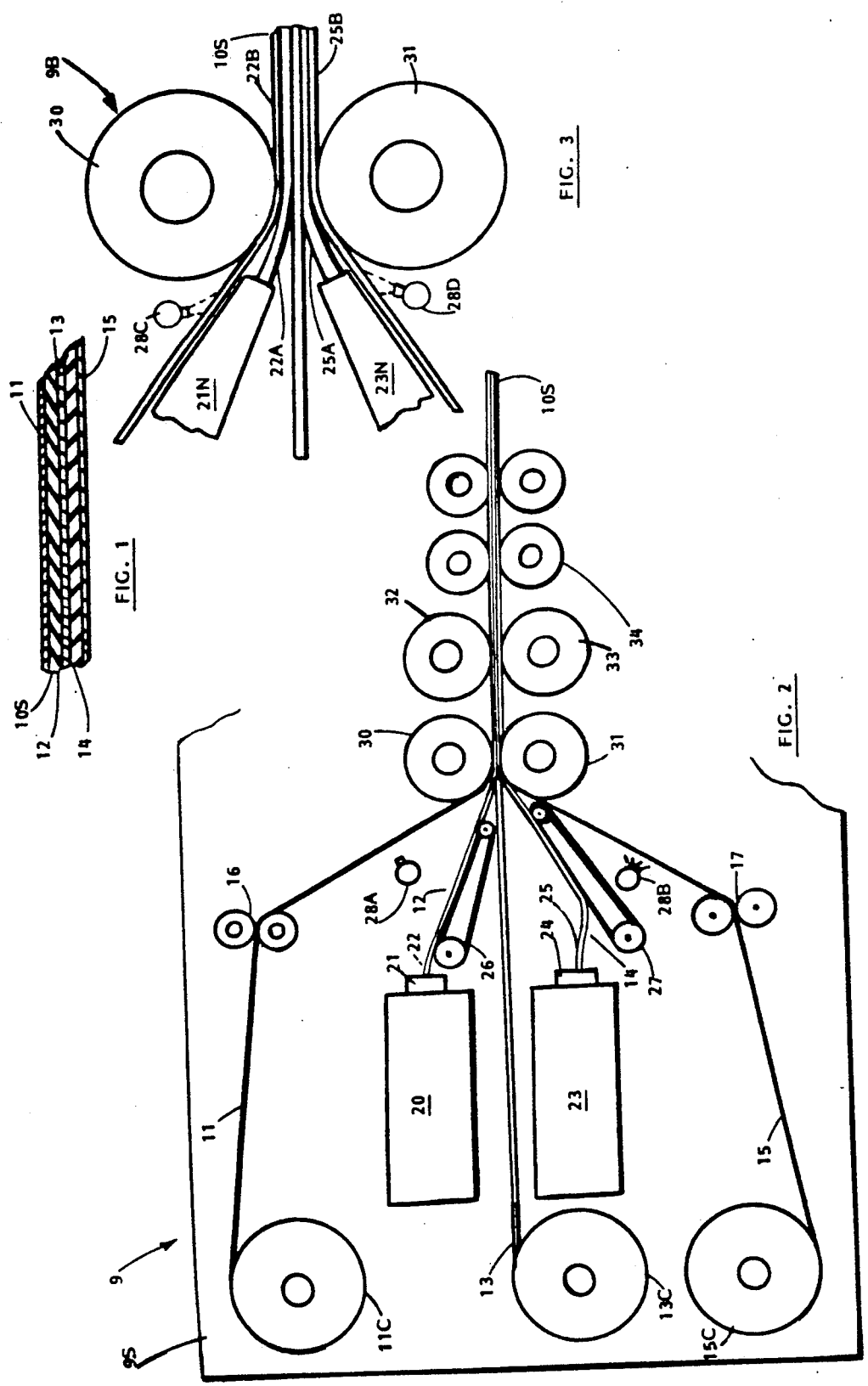

METHOD AND APPARATUS FOR FORMING A COMPOSITE MATERIAL

BACKGROUND OF THE INVENTION

1. Field of the Invention

The invention is in the field of continuously manufacturing composite sheet and structural materials, particularly of metal and plastic wherein either or both the plastic and metal components are continuously formed and fed together with the other component or components to form a laminate thereof having certain improved characteristics. In a preferred form, three thin sheets of metal are driven from supplies thereof while two sheets or layers of plastic are supplied between alternate sheets of the metal by extrusion forming such plastic and conveying same between the metal sheets. The five sheets are adhesively or roll bonded together on a continuous basis in a rolling mill or die after which they are either rolled into a coil or coils, post formed to structural shape, slit or otherwise cut longitudinally or cut on the fly to form selected lengths thereof.

2. The Prior Art

The prior art consists of laminating apparatus in which two metal and plastic sheets are brought together, either or both supplied from respective coils or where the plastic is extruded directly onto one surface of a sheet of metal.

SUMMARY OF THE INVENTION

This invention relates to an apparatus and method for forming new and improved laminated materials, particularly produced of metal and plastic, wherein the plastic serves to impart one or more improved characteristics to the metal portions of the laminate, such as to add an improvement in strength, reduction in weight, vibration absorption or deadening characteristics, insulation characteristics, the absorption of radio frequency energy, the absorption or deadening of sound, or other characteristics. The invention is concerned with the fabrication of laminated thin sheets, plates and structural members formed of three or more layers of metal and plastic and, in certain instances, preferably formed of at least five layers of metal and plastic wherein thin sheets of metal, such as steel or aluminum, form the outer layers of the laminate and are utilized per se or are also covered with plastic sheet material or a thin coating of same.

Accordingly it is a primary object of this invention to provide a new and improved apparatus and method for continuously forming new and improved laminates of metal and plastic.

Another object is to provide an apparatus and method for continuously forming composite sheet materials of metal and plastic.

Another object is to provide an apparatus and method for continuously forming composite sheet materials of filament reinforced metal and plastic laminates.

Another object is to provide an apparatus and method for continuously forming improved structural members of metal and plastic.

Another object is to provide an apparatus and method for continuously forming an improved laminate containing reinforcing filaments beneath its surface which are randomely disposed in one or more layers.

Another object is to provide an apparatus and method for continuously forming laminates which contain one or more layers of parallel arrays of reinforcing filaments.

Another object is to provide an apparatus and method for continuously forming improved laminated sheet material having surface layers thereof made of metal.

Another object is to provide an apparatus and method for continuously forming improved sheet materials having superior weight and strength characteristics.

Another object is to provide new and improved plastic structures formed of laminated materials including one or more extrusions.

Another object is to provide new and improved structures in laminated sheet materials which are filament reinforced with a plurality of different reinforcing materials.

With the above and such other objects in view as may hereinafter more fully appear, the invention consists of the novel constructions, combinations and arrangements of parts and the method employed for forming laminated shtee structures and the like, as will be more fully described and illustrated in the accompanying drawings, but it is to be understood that changes, variations and modifications may be resorted to which fall within the scope of the invention as claimed.

BRIEF DESCRIPTION OF THE DRAWINGS

FIG. 1 is a partial side view in cross section of a five ply laminated sheet structure.

FIG. 2 is a side view of an automatic laminating apparatus with which the laminate of FIG. 1 may be be produced.

FIG. 3 is a partial side view of part of a modified form of the apparatus of FIG. 1.

In FIG. 1 is shown a laminated sheet 10S formed of alternate layers of plastic and metal, three of which, denoted 11, 13 and 15 are sheet metal with two layers or sheets 12 and 14 formed of plastic. A preferable combination is one in which the three metal sheets 11, 13 and 15 are made of high strength aluminum alloy and are roll formed to sheet shapes varying from about 0.003" to 0.020", while sheets or layers 12 and 14 are a high strength plastic resin, such as an aramid, polycarbonate or other resin varying from about 0.002" to 0.020" depending on the application of the composite sheet 10S and its desired strength and other characteristics. If the sheet 10S is desired to be used where vibration is a problem and deadening material is required, either or both plastic layers 12 and 14 may be formed of a suitable elastomer, such as ethylene vinyl acetate, butylene rubber, flexible polyurethane or other flexible resin or cellular formations of such resins which are formed by self expanding or forming the resins in situ against the surfaces of the metal sheets.

In FIG. 2 is shown an apparatus 9 for automatically and continuously producing a laminated material, such as the laminate 10S of FIG. 1. A common support, denoted 9S, is preferably provided for three coils 11C, 13C and 15C of sheet metal, two plastic sheet extruders 20 and 23, two powered belt conveyors 26 and 27 for receiving the extruded plastic sheets and their motor drives [not shown], one or more pairs of laminating rolls 30, 31 and one or more post forming devices for the laminated sheet, such as a roll forming or rolling mill 34.

Coils 11C, 13C and 15C each contain substantial lengths of respective sheets 11, 13 and 15 of metal of the same width, which metal sheets may be of the same or different thicknesses varying from one or more thousandths of an inch to as much as 1/16th. of an inch thick each wherein such sheets may be all of the same thickness or may vary in thickness as desired and may comprise the same metal or different metals. One or more pairs 16 and 17 of guide rolls may be free wheeling or powered and operable to receive and guide the sheets 11 and 15 from coils 11C and 15C to travel paths towards each other, which paths are defined by a pair of spaced-apart laminating rolls 30, 31 which also receive sheet 13 from coil 13C and two sheets or layers 12 and 14 of the described plastic, which are passed continuously from sheet-like openings in extrusion dies 21 and 24 of two extruders 20 and 23 which are disposed apart, one above the other, to permit metal sheet 13 to pass between the two plastic sheets and to form the center or core of the laminate material 10S. The motors driving belt conveyors 26 and 27 are preferably speed controlled in their operation, together with the motor or motors driving the laminating rolls 30 and 31 and post forming rolls 32, 33, 34, etc., if employed, to drive all sheets at the same lineal speed to properly effect lamination in a manner to form composite laminate 10S on a continuous basis. Laminate 10S may be further formed by means of the post forming rolls and automatically cut to desired lengths or may be retained in a sheet or plate form and coiled into one or more large coils or also cut to predetermined lengths by means of a flying cutter. A master computer with feedback control may be employed to effect such motor control. Notations 28A, 28B refer to respective spray heads for adhesive material disposed to respectively spray a suitable adhesive in a controlled manner against the inner surfaces of the metal sheets 11 and 15 and/or the surfaces of the core sheet 13 or the upper surfaces of plastic sheets 12 and 14, so as to provide bonding means for selected or all of the contacting surfaces of the laminate. If necessary and if the extruded or otherwise applied plastic layers 12 and 14 do not provide suitable adhesion when pressure is applied by the laminating rolls. Suitable applying means cooperating with or replacing the spray heads 28A and 28B may also be controllably operated to convey and blow or otherwise apply short lengths of reinforcing fibers of plastic such as aramid resin, glass, high strength carbon, metal or other material or one or more woven formations of one or more of such materials between the sheets 11, 12, 14 and 15 and/or between the sheets 12, 13 and 14 for forming high strength laminated sheet material thereof. Such filaments or woven material may also be so applied between but two of the five laminated sheets for reinforcing the laminate.

The forming and laminating apparatus 9 of FIG. 2 may be supported by a structural metal frame or housing 9S with the laminated sheet 10S being driven in a horizontal direction, as shown, to a further apparatus (not shown) for forming such laminate by deforming between rolls or in a press, die-cutting, sawing or otherwise fabricating same into flat or formed lengths thereof, slitting and coiling or stacking select lengths thereof for storage and shipment. The apparatus 9 may also be constructed and operative to feed the sheets 11, 13 and 15 in a downward direction and the extruded sheet materials 12 and 14 downwardly therebetween by gravity or powered conveying and guiding means.

In FIG. 3 is shown a modified form of laminating apparatus 9B for forming five ply laminates as described, wherein sheet-like layers of plastic are fed immediately from respective sheeting dies of an extruder or nozzles 21N and 23N between respective surfaces of converging metal sheets 11 and 15 and a central metal sheet 13, all of which are brought together as described between laminating rolls or dies 30 and 31. Notations 22A and 25A refer to respective sheet-like formations of plastic as they exit from sheet-like openings at the ends of respective extrusion dies or nozzles 21N and 23N which are disposed close to the volumes or spacings 10A and 10B between respective sheets 11, 13 and 15 as they are brought together between the rolls.

In a modified form of the apparatus illustrated in FIG. 3, the ends of the nozzles 21N and 23N may be shaped and disposed so that their end surfaces are respectively in slidable engagement with the inside surfaces of sheets 11, 13 and 15, 13 so as to serve as a dynamic seal operable to prevent plastic extruding or exuding from such nozzles from flowing other then downstream between the closely spaced, but separated, surfaces of the sheets 11, 13 and 15. By controlling the pressure applied to flow or extrude the plastic exiting nozzles or dies 21N and 23N in accordance with the speed at which the three sheets 11, 13 and 15 are driven, the plastic layers 22B and 25B of the laminated material may be properly formed and solidified downstream of the rollers 30 and 31 and either fusion or adhesively bonded to the facing surfaces of the metal sheets.

Notations 28C and 28D refer to respective spray heads located off the surfaces of sheets 11 and 13 for continuously applying respective layers of plastic for coating the outside surfaces thereof.

Additional forms of the invention are noted as follows:

1. The five sheet-like layers of the laminate illustrated in FIG. 1 or that illustrated in FIG. 3 may be formed of five sheets of the same metal which are either continuously formed and/or fed from respective coil formations of such metal and are either cold welded or roll-bonded together or are adhesively bonded together by the application of suitable adhesive material to the interfacial areas of the sheets, as described.

2. In another form of the invention, one or more of the three metal sheets, such as the core sheet and/or the outer-face sheets, may be continuously formed and fed from an extruder or rolling mill to the laminated apparatus or rotary laminator described while the plastic interlayer sheets are continuously extrusion formed to shape. In such an arrangement, the speed of extrusion or roll forming is adjusted or suitable heat transfer means are provided, so as to effect a suitable fusion bond between the surfaces of the extruded plastic sheets and the metal surfaces.

3. If it is desired to provide reinforcing filaments, such as glass fibers, carbon filaments or high strength plastic filaments to reinforce the composite, laminated sheet material described, such filaments may be either added to the extrudate plastic prior to extrusion or continuously flowed to either or both surfaces of the extruded plastic sheets and compressed in the rolling mill into such sheets to form one or more respective layers of reinforcing filaments which may be randomly disposed in such layer or layers or extend as one or more parallel, longitudinal rays of reinforcing filaments.

4. In the fabrication of filament reinforced metal panels and sheet material, two, three, four, five or more metal sheets may be continuously fed from respective coil formations thereof, extruders or rolling mills which form such sheets wherein one or more of such metal sheets are formed from powdered metal or metal in a molten state fed through a die or rolling dies together with one or more random and/or parallel arrays of such reinforcing filaments as ceramic or high strength carbon filaments. The resulting laminate may be formed of roll-bonded or interfacially welded separate sheets or panels wherein one or more of the layers defining the composite panel may contain such reinforcing filaments. Such composite metal panel may be formed of two or more different metals which are adhesively bonded, hot or cold roll bonded or interfacially welded together.

5. In a preferred form of the laminate formed as described, the capping sheets 11 and 15 are formed of high strength aluminum, the plastic formations 22 and 25 are formed of aramid resin and the center sheet 13 is formed of high strength aluminum. Other structures include forming one or more of the metal sheets of steel with the outer sheets 11 and 15 formed of stainless steel foil.

6. The described reinforcing filaments may also be continuously formed to shape by machinery for extruding same upstream of the laminator and conveying the filaments in parallel array or other suitable condition to the proper region or regions of the laminating apparatus or to dispose same against one or more surfaces of one or more of the described sheet materials on which such surface or surfaces the filamentary material is retained by gravity or by means of an adhesive applied thereto and employed in the lamination process to effect the desired laminating.

What is claimed is:

1. A method of forming a composite structural member comprising:
   (a) continuously feeding first, second and third sheets of metal from respective supplies thereof in a given direction whereby said first and third sheets are guided along respective converging paths in a given direction towards said second sheet which is disposed between said first and third sheets and said three sheets are driven at substantially the same speed,
   (b) guiding said first and third sheets along paths which extend substantially parallel to each other beyond the converging paths thereof and are space-separated from each other to account for the second sheet driven therebetween and to provide respective spacings between said first and second sheets and said second and third sheets,
   (c) continuously extrusion forming first and second extrusions of plastic having sheet configurations and driving said extrusion extrusions as respective discrete formations thereof along respective converging paths to dispose each respectively between said first and second metal sheets and said second and third metal sheets at a common location between a pair of laminating rolls, and
   (d) continuously driving said laminating rolls at said common location to compress said first, second and third metal sheets together with said first and second plastic extrusions disposed between said respective pairs of said sheets to form a laminated sheet-like assembly of said five sheets to provide a composite, high strength lamination of said metal and plastic sheets.

2. A method in accordance with claim 1 including computer controlling the operation of respective motors and rolls driven thereby to drive and feed said first, second and third metal sheets together respectively against said first and second plastic sheet extrusions in a manner to form an integral lamination of said metal and plastic sheets.

3. A method in accordance with claim 2 which includes continuously roll forming the laminate to a predetermined shape, after it is formed of said five sheets.

4. Apparatus for forming composite material comprising:
   (a) first, second and third means for supplying first, second and third sheets of metal of substantially similar width,
   (b) fourth means for driving said three metal sheets at substantially similar velocities in a given direction,
   (c) fifth means for guiding said three metal sheets along respective paths to bring the sheets proximate to each other wherein said second sheet is disposed between said first and third sheets,
   (d) sixth means for continuously extruding a first sheet of plastic and driving same at substantially the same velocity as the velocity of said first, second and third metal sheets,
   (e) means for guiding said first plastic sheet between said first and second metal sheets,
   (f) seventh means for continuously extruding a second sheet of plastic and driving same at substantially the velocity of said first, second and third metal sheets,
   (g) means for guiding said second plastic sheet between said second and third metal sheets,
   (h) means for continuously applying select amounts of adhesive to the interfaces between said first, second and third sheets of metal and said first and second sheets of plastic,
   (i) eighth means including a laminator operable to receive said first, second and third sheets of metal with said first and second sheets of plastic disposed respectively between said first and second metal sheets and said second and third metal sheets, said laminator being operable to compress all five sheets together as they are driven and to effect their bonding by means of said adhesive as they are driven into a unitary composite structure forming a composite laminate thereof.

5. Apparatus for forming composite material comprising:
   (a) first, second and third means for supplying first, second and third sheets of metal of substantially similar width,
   (b) fourth means for driving said three metal sheets at substantially similar velocities in a given direction,
   (c) fifth means for guiding said three metal sheets along respective paths to bring the sheets proximate to each other wherein said second sheet is disposed between said first and third sheets,
   (d) sixth means for continuously extruding a first sheet of plastic and driving same at substantially the same velocity as the velocity of said first, second and third metal sheets,
   (e) means for guiding said first plastic sheet between said first and second metal sheets,
   (f) seventh means for continuously extruding a second sheet of plastic and driving same at substantially the velocity of said first, second and third metal sheets,
   (g) means for guiding said second plastic sheet between said second and third metal sheets,
   (h) eight means including a laminator operable to receive said first, second and third sheets of metal with said first and second sheets of plastic disposed respectively between said first and second metal sheets and said second and third sheets, means for feeding reinforcing filamentary material between at least two of the sheets fed to said laminator, said laminator being operable to compress all five sheets and said filamentary material together as they are driven and fed into a unitary composite structure forming a composite laminate thereof.

6. Apparatus for forming composite material comprising:
(a) first, second and third means for supplying first, second and third sheets of metal of substantially similar width,
(b) fourth means for driving said three metal sheets at substantially similar velocities in a given direction,
(c) fifth means for guiding said three metal sheets along respective paths to bring the sheets proximate to each other wherein said second sheet is disposed between said first and third sheets,
(d) sixth means for continuously extruding a first sheet of plastic and driving same at substantially the same velocity as the velocity of said first, second and third metal sheets,
(e) means for guiding said first plastic sheet between said first and second metal sheets,
(f) seventh means for continuously extruding a second sheet of plastic and driving same at substantially the velocity of said first, second and third metal sheets,
(g) means for guiding said second plastic sheet between said second and third metal sheets,
(h) eighth means including a laminator operable to receive said first, second and third sheets of metal with said first and second sheets of plastic disposed respectively between said first and second metal sheets and said second and third metal sheets and means for forming and continuously feeding reinforcing filamentary material, such as woven filamentary material, between at least two of said sheets fed to said laminator, said laminator being operable to compress all five sheets and said filamentary material together as they are driven into a unitary composite structure forming a composite laminate thereof.

* * * * *